US009110356B2

(12) United States Patent
Imafuji et al.

(10) Patent No.: US 9,110,356 B2
(45) Date of Patent: *Aug. 18, 2015

(54) CAMERA ACCESSORY, CAMERA BODY AND CAMERA SYSTEM

(71) Applicant: NIKON CORPORATION, Tokyo (JP)

(72) Inventors: Kazuharu Imafuji, Kawasaki (JP); Masafumi Oikawa, Mikata (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,673

(22) Filed: Apr. 29, 2014

(65) Prior Publication Data

US 2014/0233936 A1    Aug. 21, 2014

Related U.S. Application Data

(63) Continuation of application No. 13/944,449, filed on Jul. 17, 2013, now Pat. No. 8,746,996, which is a continuation of application No. 13/687,083, filed on Nov. 28, 2012, now abandoned, which is a (Continued)

(30) Foreign Application Priority Data

Feb. 25, 2011   (JP) ................................. 2011-039430
Aug. 31, 2011   (JP) ................................. 2011-189736

(51) Int. Cl.
*G03B 17/00*     (2006.01)
*G03B 17/56*     (2006.01)
(Continued)

(52) U.S. Cl.
CPC ............... *G03B 17/565* (2013.01); *G02B 7/08* (2013.01); *G02B 7/14* (2013.01); *G03B 7/20* (2013.01);
(Continued)

(58) Field of Classification Search
USPC ................... 396/529–532; 358/827, 828, 830
See application file for complete search history.

(56) References Cited

U.S. PATENT DOCUMENTS 5,003,399 A      3/1991   Ishimaru et al.
5,012,264 A *    4/1991   Nagano et al. ................ 396/301
(Continued)

FOREIGN PATENT DOCUMENTS

JP      H2-148026        6/1990
JP      H7-092540 A      4/1995
(Continued)

OTHER PUBLICATIONS

Jan. 18, 2013 Office Action issued in U.S. Appl. No. 13/687,083.
(Continued)

*Primary Examiner* — Clayton E Laballe
*Assistant Examiner* — Warren K Fenwick
(74) *Attorney, Agent, or Firm* — Oliff PLC

(57) ABSTRACT

A camera accessory is detachably mounted at a camera body that includes a first body contact point, a second body contact point, a third body contact point, a fourth body contact point and a fifth body contact point and detects disengagement of the camera accessory when the fifth body contact point sustains a signal level corresponding to a first truth value continuously over a length of time equal to or greater than a predetermined time length. In the camera accessory, the accessory-side communication control device executes control so as to ensure that the signal assuming a level corresponding to the first truth value is not continuously output from the fifth accessory contact point any longer than the predetermined time length while the operating voltage supply from the camera body is provided via the first accessory contact point.

17 Claims, 8 Drawing Sheets

Related U.S. Application Data continuation of application No. 13/403,427, filed on Feb. 23, 2012, now Pat. No. 8,342,760.

(60) Provisional application No. 61/554,672, filed on Nov. 2, 2011.

(51) Int. Cl.
*G02B 7/08* (2006.01)
*G02B 7/14* (2006.01)
*G03B 7/20* (2006.01)
*G03B 17/14* (2006.01)
*H04N 5/225* (2006.01)
*H04N 5/232* (2006.01)

(52) U.S. Cl.
CPC ............... *G03B 17/00* (2013.01); *G03B 17/14* (2013.01); *H04N 5/2251* (2013.01); *H04N 5/23209* (2013.01); *G03B 2206/00* (2013.01); *G03B 2217/18* (2013.01)

(56) References Cited

U.S. PATENT DOCUMENTS

| | | | |
|---|---|---|---|
| 5,664,245 A | 9/1997 | Kurihara et al. | |
| 8,342,760 B2* | 1/2013 | Imafuji et al. | 396/529 |
| 8,346,076 B2* | 1/2013 | Wood et al. | 396/429 |
| 8,746,996 B2* | 6/2014 | Imafuji et al. | 396/529 |
| 2004/0202464 A1 | 10/2004 | Miyasaka et al. | |
| 2006/0165401 A1 | 7/2006 | Doi et al. | |
| 2007/0147815 A1 | 6/2007 | Tanaka | |
| 2012/0057860 A1* | 3/2012 | Hasuda et al. | 396/531 |
| 2012/0201532 A1* | 8/2012 | Hasuda et al. | 396/531 |

FOREIGN PATENT DOCUMENTS

| | | | |
|---|---|---|---|
| JP | 08-095144 A | 4/1996 | |
| JP | A-08-095144 | 4/1996 | |
| JP | 2000-047308 | 2/2000 | |
| JP | 2001-013569 A | 1/2001 | |
| JP | A-2001-013569 | 1/2001 | |
| JP | 2003-153064 A | 5/2003 | |
| JP | 2005-010703 A | 1/2005 | |
| JP | A-2005-010703 | 1/2005 | |
| JP | 2005-037824 A | 2/2005 | |
| JP | A-2005-037824 | 2/2005 | |

OTHER PUBLICATIONS

Aug. 19, 2013 Office Action issued in U.S. Appl. No. 13/944,449.
Search Report issued in European Application No. 12156993.3 dated Jul. 5, 2012.
Office Action issued in U.S. Appl. No. 13/687,083, filed Jan. 18, 2013.
Office Action issued in U.S. Appl. No. 13/944,449, filed Aug. 19, 2013
Jun. 2, 2015 Office Action issued in Japenese Applicaion No. 2012-090240.
Jun. 18, 2015 Office Action issued in U.S. Appl. No. 14/722,902.

* cited by examiner

CAMERA ACCESSORY, CAMERA BODY AND CAMERA SYSTEM

This is a Continuation of application Ser. No. 13/944,449 filed Jul. 17, 2013, which in turn is a Continuation of application Ser. No. 13/687,083 filed Nov. 28, 2012, which in turn is a Continuation of application Ser. No. 13/403,427 filed Feb. 23, 2012, which claims the benefit of U.S. Provisional Application No. 61/554,672 filed Nov. 2, 2011. This application also claims priority from Japanese Patent Application No. 2011-039430 filed Feb. 25, 2011, and Japanese Patent Application No. 2011-189736 filed Aug. 31, 2011. The disclosures of each of the earlier applications are incorporated herein by reference in its entirety.

BACKGROUND OF THE INVENTION

1. Field of the Invention

The present invention relates to a camera accessory, a camera body and a camera system.

2. Description of Related Art

A camera system known in the related art may include contact points to enable communication between the camera body and an exchangeable lens (photographic lens). In such a camera system, engagement/disengagement of the exchangeable lens may be detected via the communication contact points. For instance, Japanese Laid Open Patent Publication No. H8-95144 discloses a camera system that detects engagement of a photographic lens barrel via a communication line BINTL between the photographic lens barrel and the camera body. Since the communication line BINTL is utilized both for inputting data to the camera body and for outputting data from the camera body, a BCPU inside the camera body needs to switch a terminal of the communication line so as to allow the terminal to function as an input terminal when detecting photographic lens barrel engagement/disengagement and to switch the same terminal so as to allow it to function as an output terminal when conducting communication.

SUMMARY OF THE INVENTION

There is an issue with the engagement/disengagement detection mechanism disclosed in the publication in that its structure is bound to be complicated.

A camera accessory to be detachably mounted at a camera body that includes a first body contact point, a second body contact point, a third body contact point, a fourth body contact point and a fifth body contact point and detects disengagement of the camera accessory when the fifth body contact point sustains a signal level corresponding to a first truth value continuously over a length of time equal to or greater than a predetermined time length, according to a first aspect of the present invention, the camera accessory comprises: a mounting device to be detachably mounted at the camera body; a first accessory contact point that is connected with the first body contact point while the camera accessory is engaged with the camera body so as to receive an operating voltage supplied from the camera body; a second accessory contact point that is connected with the second body contact point while the camera accessory is engaged with the camera body so as to allow a clock signal output from the camera body to be input thereat; a third accessory contact point that is connected with the third body contact point while the camera accessory is engaged with the camera body so as to allow a first data signal output from the camera body to be input thereat; a fourth accessory contact point that is connected with the fourth body contact point while the camera accessory is engaged with the camera body so as to allow a second data signal to be output to the camera body; a fifth accessory contact point that is connected with the fifth body contact point while the camera accessory is engaged with the camera body so as to allow a signal assuming a level corresponding to the first truth value to be output to the camera body during a time period in which input operation for the first data signal via the third accessory contact point and output operation for the second data signal via the fourth accessory contact point are disallowed; and an accessory-side communication control device that executes the input operation for the first data signal from the camera body via the third accessory contact point and the output operation for the second data signal to output the second data signal to the camera body via the fourth accessory contact point in synchronization with the clock signal input at the second accessory contact point, wherein: the accessory-side communication control device executes control so as to ensure that the signal assuming a level corresponding to the first truth value is not continuously output from the fifth accessory contact point any longer than the predetermined time length while the operating voltage supply from the camera body is provided via the first accessory contact point.

A camera accessory to be detachably mounted at a camera body that includes a first body contact point, a second body contact point, a third body contact point, a fourth body contact point and a fifth body contact point and detects disengagement of the camera accessory when the fifth body contact point sustains a signal level corresponding to a first truth value continuously over a length of time equal to or greater than a predetermined time length, according to a second aspect of the present invention, the camera accessory comprises: a mounting device to be detachably mounted at the camera body; a first accessory contact point that is connected with the first body contact point while the camera accessory is engaged with the camera body so as to receive an operating voltage supplied from the camera body; a second accessory contact point that is connected with the second body contact point while the camera accessory is engaged with the camera body so as to allow a clock signal output from the camera body to be input thereat; a third accessory contact point that is connected with the third body contact point while the camera accessory is engaged with the camera body so as to allow a first data signal output from the camera body to be input thereat; a fourth accessory contact point that is connected with the fourth body contact point while the camera accessory is engaged with the camera body so as to allow a second data signal to be output to the camera body; a fifth accessory contact point that is connected with the fifth body contact point while the camera accessory is engaged with the camera body so as to allow a signal assuming a level corresponding to the first truth value to be output to the camera body during a time period in which input operation for the first data signal via the third accessory contact point and output operation for the second data signal via the fourth accessory contact point are disallowed; and an accessory-side communication control device that executes the input operation for the first data signal from the camera body via the third accessory contact point and the output operation for the second data signal to output the second data signal to the camera body via the fourth accessory contact point in synchronization with the clock signal input at the second accessory contact point, wherein: the accessory-side communication control device executes control so that a signal, which disallows detection of disengagement of the camera accessory from the camera body, is output from the fifth accessory contact point while the operating voltage supply from the camera body is provided via the first accessory contact point.

A camera accessory to be detachably mounted at a camera body that includes a first body contact point, a second body contact point, a third body contact point, a fourth body contact point and a fifth body contact point and detects disengagement of the camera accessory when the fifth body contact point sustains a signal level corresponding to a first truth value continuously over a length of time equal to or greater than a predetermined time length, according to a third aspect of the present invention, the camera accessory comprises: a mounting device to be detachably mounted at the camera body; a first accessory contact point that is connected with the first body contact point while the camera accessory is engaged with the camera body so as to receive an operating voltage supplied from the camera body; a second accessory contact point that is connected with the second body contact point while the camera accessory is engaged with the camera body so as to allow a clock signal output from the camera body to be input thereat; a third accessory contact point that is connected with the third body contact point while the camera accessory is engaged with the camera body so as to allow a first data signal output from the camera body to be input thereat; a fourth accessory contact point that is connected with the fourth body contact point while the camera accessory is engaged with the camera body so as to allow a second data signal to be output to the camera body; a fifth accessory contact point that is connected with the fifth body contact point while the camera accessory is engaged with the camera body so as to allow a signal assuming a level corresponding to the first truth value to be output to the camera body during a time period in which input operation for the first data signal via the third accessory contact point and output operation for the second data signal via the fourth accessory contact point are disallowed; and an accessory-side communication control device that executes the input operation for the first data signal from the camera body via the third accessory contact point and the output operation for the second data signal to output the second data signal to the camera body via the fourth accessory contact point in synchronization with the clock signal input at the second accessory contact point, wherein: the accessory-side communication control device controls an output from the fifth accessory contact point so as to ensure that the camera body does not detect disengagement of the camera accessory from the camera body while the operating voltage supply from the camera body is provided via the first accessory contact point.

According to a fourth aspect of the present invention, in the camera accessory according to any one of the first to third aspects, it is preferable that the accessory-side communication control device outputs a signal assuming a level corresponding to a second truth value different from the first truth value via the fifth accessory contact point while the operating voltage supply from the camera body is provided via the first accessory contact point and the accessory-side communication control device executes the input operation for the first data signal and the output operation for the second data signal.

According to a fifth aspect of the present invention, in the camera accessory according to any one of the first to fourth aspects, it is preferable that the accessory-side communication control device controls signal levels at the second through fifth accessory contact points so as to ensure that the fifth accessory contact point, among the second through fifth accessory contact points, undergoes fewest signal level shifts during the input operation for the first data signal or the output operation for the second data signal.

According to a sixth aspect of the present invention, the camera accessory according to the fifth aspect may further comprises four additional accessory contact points each connected with one of four body contact points used for a communication operation different from the input operation for the first data signal or the output operation for the second data signal, which are different from the first through fifth body contact points at the camera body, wherein: the accessory-side communication control device controls signal levels at the second through fifth accessory contact points and the four additional accessory contact points so as to ensure that the fifth accessory contact point, among the second through fifth accessory contact points and the four additional accessory contact points, undergoes fewest signal level shifts.

According to a seventh aspect of the present invention, in the camera accessory according to any one of the first to sixth aspects, the fifth accessory contact point may be grounded via a pull-down resistor inside the camera accessory.

A camera body according to an eighth aspect of the present invention comprises: a mounting device at which a camera accessory that includes a first accessory contact point, a second accessory contact point, a third accessory contact point, a fourth accessory contact point and a fifth accessory contact point is detachably mounted; a first body contact point that is connected with the first accessory contact point while the camera body is engaged with the camera accessory so as to provide an operating voltage supply to the camera accessory; a second body contact point that is connected with the second accessory contact point while the camera body is engaged with the camera accessory so as to allow a clock signal to be output to the camera accessory; a third body contact point that is connected with the third accessory contact point while the camera body is engaged with the camera accessory so as to allow a first data signal to be output to the camera accessory; a fourth body contact point that is connected with the fourth accessory contact point to allow a second data signal from the camera accessory to be input thereat when the camera body is engaged with the camera accessory; a fifth body contact point that is connected with the fifth accessory contact point while the camera body is engaged with the camera accessory so as to allow a signal assuming a level corresponding to a first truth value to be input thereat from the camera accessory during a time period in which output operation for the first data signal via the third body contact point and input operation for the second data signal via the fourth body contact point are disallowed; a body-side communication control device that outputs the clock signal from the second body contact point and executes the output operation for the first data signal to output the first data signal to the camera accessory via the third body contact point and the input operation for the second data signal to input the second data signal from the camera accessory via the fourth body contact point in synchronization with the clock signal; and an engagement/disengagement detection device that detects disengagement of the camera accessory when the fifth body contact point sustains a signal level corresponding to the first truth value continuously over a length of time equal to or greater than a predetermined time length, wherein: the body-side communication control device receives, via the fifth body contact point, a signal that does not sustain the signal level corresponding to the first truth value continuously over a length of time equal to or greater than the predetermined length of time when the camera accessory is mounted at the mounting device.

According to a ninth aspect of the present invention, in the camera body according to the eighth aspect, it is preferable that the body-side communication control device receives, via the fifth body contact point, a signal assuming a signal level corresponding to a second truth value different from the first truth value while the output operation for the first data signal or the input operation for the second data signal is executed by the body-side communication control device, and receives a signal, via the fifth body contact point, assuming a signal level corresponding to the first truth value while the output operation for the first data signal or the input operation for the second data signal is not in progress.

According to a tenth aspect of the present invention, in the camera body according to the eighth or ninth aspect, it is preferable that the body-side communication control device receives, via the fifth body contact point, a signal undergoing fewest signal level shifts among signals exchanged via the second through fifth body contact points during the output operation for the first data signal or the input operation for the second data signal.

According to an eleventh aspect of the present invention, the camera body according to the tenth aspect may further comprises: four additional body contact points used for a communication operation different from the output operation for the first data signal or the input operation for the second data signal, which are each connected with one of four accessory contact points at the camera accessory and are different from the first through fifth body contact points, wherein: the body-side communication control device receives, via the fifth body contact point, a signal undergoing fewest signal level shifts among signals exchanged via the second through fifth body contact points and the four additional body contact points during the output operation for the first data signal or the input operation for the second data signal.

A camera system according to a twelfth aspect comprises: a camera body; and an accessory to be detachably mounted at the camera body, wherein: the camera body comprises: a first body contact point via which an operating voltage supply to the accessory is provided; a second body contact point via which a clock signal is output to the accessory; a third body contact point via which a first data signal is output to the accessory; a fourth body contact point via which a second data signal from the accessory is input; a fifth body contact point via which a signal from the accessory and assuming a level corresponding to a first truth value is input during a time period in which output operation for the first data signal via the third body contact point and input operation for the second data signal via the fourth body contact point are disallowed; a body-side communication control device that outputs the clock signal from the second body contact point and executes the output operation for the first data signal to output the first data signal to the accessory via the third body contact point and the input operation for the second data signal to input the second data signal from the accessory via the fourth body contact point in synchronization with the clock signal; and an engagement/disengagement detection device that detects disengagement of the accessory when the fifth body contact point sustains a signal level corresponding to the first truth value continuously over a length of time equal to or greater than a predetermined time length; and the accessory comprises: a first accessory contact point that is connected with the first body contact point; a second accessory contact point that is connected with the second body contact point; a third accessory contact point that is connected with the third body contact point; a fourth accessory contact point that is connected with the fourth body contact point; a fifth accessory contact point that is connected with the fifth body contact point; and an accessory-side communication control device that executes the input operation for first data signal to input the first data signal from the camera body via the third accessory contact point and the output operation for the second data signal to output the second data signal to the camera body via the fourth accessory contact point in synchronization with the clock signal input at the second accessory contact point; and the accessory-side communication control device executes control so as to ensure that the signal assuming a level corresponding to the first truth value is not continuously output from the fifth accessory contact point any longer than the predetermined time length while the operating voltage supply from the camera body is provided via the first accessory contact point.

According to a thirteenth aspect of the present invention, in the camera system according to the twelfth aspect of the present invention, it is preferable that the accessory-side communication control device outputs a signal assuming a level corresponding to a second truth value different from the first truth value via the fifth accessory contact point while the operating voltage supply from the camera body is provided via the first accessory contact point and the accessory-side communication control device executes the input operation for the first data signal and the output operation for the second data signal, whereas the accessory-side communication control device outputs via the fifth accessory contact point, a signal assuming a signal level corresponding to the first truth value while the input operation for the first data signal or the output operation for the second data signal is not in progress.

According to a fourteenth aspect of the present invention, in the camera system according to the twelfth or thirteenth aspect, it is preferable that the accessory-side communication control device controls signal levels at the second through fifth accessory contact points so as to ensure that the fifth accessory contact point, among the second through fifth accessory contact points, undergoes fewest signal level shifts during the input operation for the first data signal or the output operation for the second data signal.

According to a fifteenth aspect of the present invention, in the camera system according to the fourteenth aspect, it is preferable that the camera body further comprises four additional body contact points used for a communication operation different from the output operation for the first data signal or the input operation for the second data signal, which are different from the first through fifth body contact points; the accessory further comprises four additional accessory contact points each connected with one of the four additional body contact points; and the accessory-side communication control device controls signal levels at the second through fifth accessory contact points and the four additional accessory contact points so as to ensure that the fifth accessory contact point, among the second through fifth accessory contact points and the four additional accessory contact points undergoes fewest signal level shifts.

According to a sixteenth aspect of the present invention, in the camera system according to any one of the twelfth to fifteenth aspect, the fifth accessory contact point may be grounded via a pull-down resistor inside the accessory.

According to a seventeenth aspect of the present invention, in the camera accessory according to any one of the first to seventh aspect, the camera accessory may be an exchangeable lens detachably mounted at the camera body.

According to an eighteenth aspect of the present invention, in the camera accessory according to any one of the first to seventh aspect, the camera accessory may be a middle accessory that includes two mount portions; and the camera body may be detachably mounted at one mount portion among the two mount portions and an exchangeable lens, which cannot be mounted directly at the camera body, may be detachably mounted at another mount portion among the two mount portions.

DESCRIPTION OF PREFERRED EMBODIMENTS

First Embodiment

Figure 1:
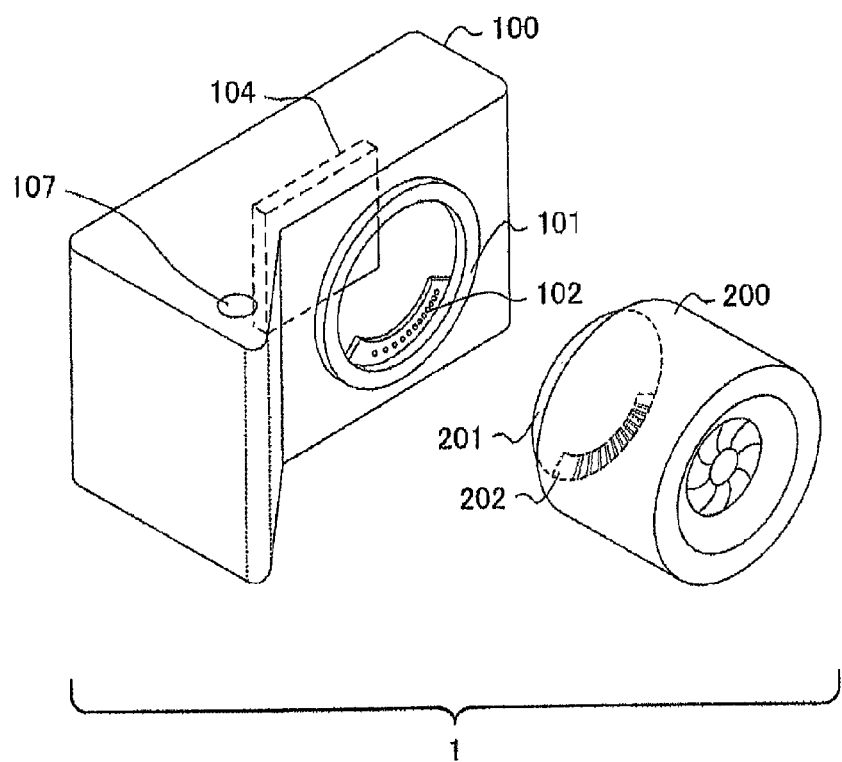
FIG. 1 is a perspective of a camera system used in conjunction with exchangeable lenses, achieved in an embodiment of the present invention.

FIG. 1 is a perspective of a camera system used in conjunction with exchangeable lenses, achieved in the first embodiment of the present invention. It is to be noted that FIG. 1 shows components pertaining to the present invention only, and that illustrations and descriptions of components not directly related to the present invention are not provided. A camera system 1 comprises a camera body 100 and an exchangeable lens (interchangeable lens, or photographic lens) 200 that can be detachably mounted at the camera body 100.

A body-side mount unit 101, at which the exchangeable lens 200 is detachably mounted, is disposed at the camera body 100. A portion that projects out along part of the inner circumference of the body-side mount unit 101 is provided at a position near the body-side mount unit 101 (on the inner circumferential side of the body-side mount unit 101) at the camera body 100 so as to be used as a holding portion (electrical connection portion) 102 that holds contact points. A plurality of contact points are disposed at the holding portion 102.

In addition, the exchangeable lens 200 includes a lens-side mount unit 201, corresponding to the body-side mount unit 101, to which the camera body 100 can be detachably mounted. A portion that projects out along part of the inner circumference of the lens-side mount unit 201 is provided at a position near the lens-side mount unit 201 (on the inner circumferential side of the lens-side mount unit 201) at the exchangeable lens 200 so as to be used as a holding portion (electrical connection portion) 202 that holds contact points. A plurality of contact points are disposed at the holding portion 202.

As the exchangeable lens 200 is mounted at the camera body 100, the holding portion 102 at which the plurality of contact points are disposed becomes electrically and physically connected with the holding portion 202 at which the plurality of contact points are disposed. Via the two holding portions 102 and 202, power is supplied from the camera body 100 to the exchangeable lens 200 and signals are exchanged between the camera body 100 and the exchangeable lens 200.

An image sensor 104, such as a CMOS image sensor or a CCD image sensor, is disposed to the rear of the body-side mount unit 101 in the camera body 100. A button 107 functioning as an input device is disposed on the top side of the camera body 100. The user is able to issue a photographing instruction, a photographing condition setting instruction or the like to the camera body 100 by operating an input device such as the button 107.

Figure 2:
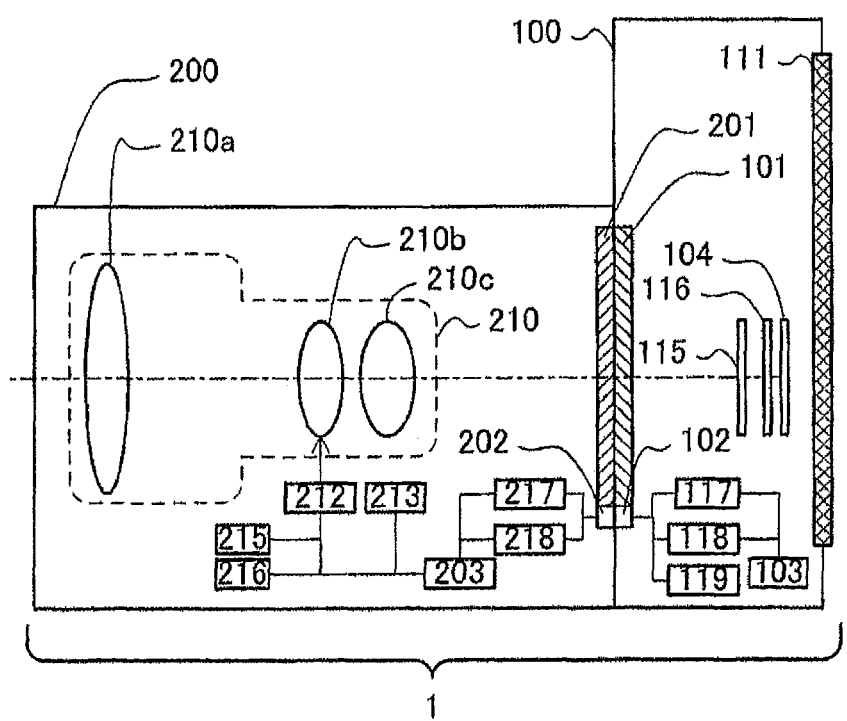
FIG. 2 is a sectional view of the camera system used in conjunction with exchangeable lenses, achieved in the embodiment of the present invention.

FIG. 2 is a sectional view of the camera system 1 used in conjunction with exchangeable lenses, achieved in the first embodiment of the present invention. The exchangeable lens 200 includes an image forming optical system 210 that forms a subject image. The image forming optical system 210 is constituted with a plurality of lenses 210a through 210c. The plurality of lenses 210a through 210c include a focusing lens 210b used when controlling the focus position for the subject image.

Inside the exchangeable lens 200, a lens-side control unit 203, which controls the various units constituting the exchangeable lens 200, is disposed. The lens-side control unit 203 is constituted with a microcomputer, its peripheral circuits and the like (none shown). A lens-side first communication unit 217, a lens-side second communication unit 218, a lens drive unit 212, a lens position detection unit 213, a ROM 215 and a RAM 216 are connected to the lens-side control unit 203.

The lens-side first communication unit 217 and the lens-side second communication unit 218 engage in data communication with the camera body 100 by enabling signal exchange between the exchangeable lens 200 and the camera body 100 via the various communication contact points disposed at the holding portion 202. The lens drive unit 212, which includes an actuator such as a stepping motor, drives the focusing lens 210b in response to a signal input thereto. The lens position detection unit 213 detects the position of the focusing lens 210b by counting the number of pulses in a signal input to, for instance, the stepping motor at the lens drive unit 212. As an alternative, it may detect the position of the focusing lens 210b via a distance encoder or the like of the known art disposed at the exchangeable lens 200.

In the ROM 215, which is a nonvolatile storage medium, specific control programs to be executed by the lens-side control unit 203 and the like are stored in advance. The RAM 216, which is a volatile storage medium, is utilized by the lens-side control unit 203 as a storage area where various types of data are stored.

In front of the image sensor 104, a shutter 115, via which the exposure condition at the image sensor 104 is controlled, and an optical filter 116 achieved by combining an optical low-pass filter and an infrared cut filter are disposed. Subject light having been transmitted through the image forming optical system 210 reaches the image sensor 104 via the shutter 115 and the filter 116.

The camera body 100 includes a built-in body-side control unit 103 that controls the various units disposed at the camera body 100. The body-side control unit 103 is constituted with a microcomputer, a RAM, peripheral circuits and the like (none shown). A body-side first communication unit 117, a body-side second communication unit 118 and a lens engagement/disengagement detection unit 119 are connected to the body-side control unit 103.

The body-side first communication unit 117 engages in data communication with the lens-side first communication unit 217 within the exchangeable lens 200 by exchanging signals with the lens-side first communication unit 217 via various communication contact points disposed at the holding portion 102. Likewise, the body-side second communication unit 118 engages in data communication with the lens-side second communication unit 218 within the exchangeable lens 200 by exchanging signals with the lens-side second communication unit 218 via various communication contact points disposed at the holding portion 102. The lens engagement/disengagement detection unit 119 detects engagement/disengagement of the exchangeable lens 200 with/from the camera body 100 based upon a signal level indicated at a specific contact point, as will be described later, among the plurality of contact points disposed at the holding portion 102.

On the rear side of the camera body 100, a display device 111 constituted with an LCD panel or the like is disposed. Under control executed by the body-side control unit 103 for the display device 111, an image of the subject generated based upon an output from the image sensor 104 (referred to as a through image) and various types of menu screens via which the photographing conditions and the like can be selected are brought up on the display device 111.

Holding Portions 102 and 202

Figure 3:
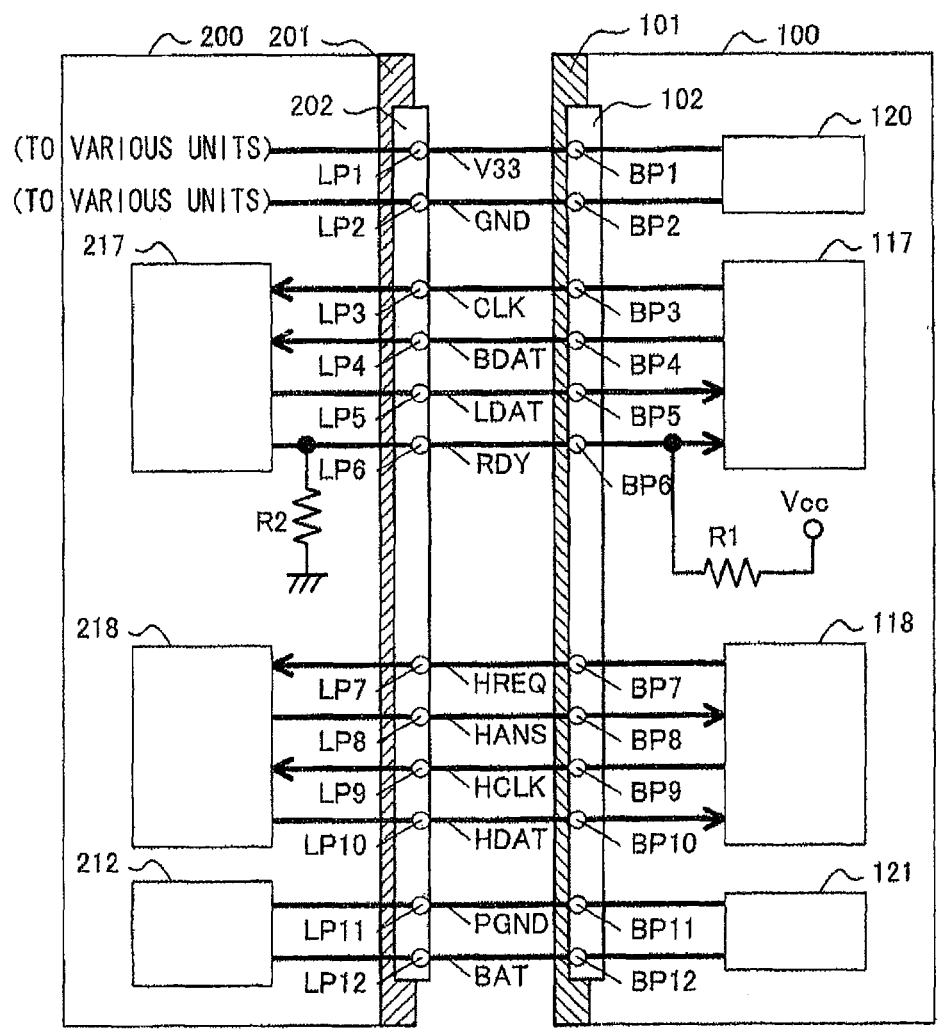
FIG. 3 is a schematic diagram pertaining to structural details of holding portions.

FIG. 3 shows the holding portions 102 and 202 in detail in a schematic diagram. As shown in FIG. 3, the holding portion 102 includes 12 contact points BP 1 through BP 12. The holding portion 202, too, includes 12 contact points LP 1 through LP 12, respectively corresponding to the 12 contact points BP 1 through BP 12. In the following description, the contact points BP 1 through BP 12 will be referred to as body-side contact points and the contact points LP 1 through LP 12 will be referred to as lens-side contact points.

The body-side contact points BP 1 and BP 2 are connected to a first power supply circuit 120 in the camera body 100. The first power supply circuit 120 supplies an operating voltage, with which various units constituting the exchangeable lens 200, except for the lens drive unit 212, are to operate, to the body-side contact point BP 1. In other words, when the exchangeable lens 200 is engaged with the camera body 100 via the body-side mount unit 101 and the lens-side mount unit 201, the operating voltage, on which the various units (including the lens-side first communication unit 217 and the lens-side second communication unit 218) in the exchangeable lens 200, except for the lens drive unit 212, are to operate, is supplied via the body-side contact point BP 1 and the lens-side contact point LP 1. The body-side contact point BP 2 is a ground terminal corresponding to the above operating voltage. Namely, the body-side contact point BP 2 and the lens-side contact point LP 2 function as ground terminals corresponding to the operating voltage.

In the following description, a signal line formed with the body-side contact point BP 1 and the lens-side contact point LP 1 will be referred to as a signal line V33. In addition, a signal line formed with the body-side contact point BP 2 and the lens-side contact point LP 2 will be referred to as a signal line GND.

The body-side contact points BP 3, BP 4, BP 5 and BP 6 are used for data communication referred to as command data communication. These four body-side contact points are connected to the body-side first communication unit 117. The lens-side contact points LP 3, LP 4, LP 5 and LP 6 to be respectively connected to these four body-side contact points are connected to the lens-side first communication unit 217. The body-side first communication unit 117 and the lens-side first communication unit 217 engage in data communication as they exchange signals via the four body-side contact points BP 3 through BP 6 and the four lens-side contact points LP 3 through LP 6. The data communication (command data communication) conducted by the body-side first communication unit 117 and the lens-side first communication unit 217 will be described in detail later.

The body-side first communication unit 117 and the lens-side first communication unit 217 judge that an input signal input via a specific contact point indicates a truth value "true" (may otherwise be referred to as 1, H, High or the like) if the signal level of the particular signal is equal to or higher than a predetermined reference level (e.g., 2.0 v). In addition, they judge that an input signal, input from a given contact point indicates a truth value "false" (may otherwise be referred to as 0, L, Low or the like) if the signal level of the signal is equal to or lower than a predetermined reference level (e.g., 0.8 v) set to a different value than the reference level mentioned above. The body-side second communication unit 118 and the lens-side second communication unit 218 make similar judgments.

In the camera body 100, the body-side contact point BP 6 is connected to a power source Vcc (e.g., 5 v) via a pull-up resistor R1. In other words, the body-side contact point BP 6 is pulled up. In the exchangeable lens 200, the lens-side contact point LP 6 is grounded via a pull-down resistor R2. In other words, the lens-side contact point LP 6 is pulled down.

The resistance values of the pull-up resistor R1 and the pull-down resistor R2 are selected so that a signal level corresponding to the truth value L (e.g., a signal level equal to or lower than 0.8 v) is assumed at the body-side contact point BP 6 when the exchangeable lens 200 is mounted at the camera body 100 and data communication via the lens-side first communication unit 217 is not in progress. The resistance values may be set so that R1=10 kΩ and R2=100Ω, for instance.

If, on the other hand, the exchangeable lens 200 is not mounted at the body-side mount unit 101, a signal level corresponding to the truth value H (e.g., 2.0 v or higher) is assumed at the body-side contact point BP 6, since the body-side contact point BP 6 is pulled up in this state.

The lens engagement/disengagement detection unit 119 is connected to the body-side contact point BP 6. The lens engagement/disengagement detection unit 119 detects engagement/disengagement of the exchangeable lens 200 based upon the signal level indicated at the body-side contact point BP 6. The engagement/disengagement detection executed by the lens engagement/disengagement detection unit 119 will be described in detail later.

It is to be noted that a signal line formed with the body-side contact point BP 3 and the lens-side contact point LP 3 will be referred to as a signal line CLK in the following description. In addition, a signal line formed with the body-side contact point BP 4 and the lens-side contact point LP 4 will be referred to as a signal line BDAT, a signal line formed with the body-side contact point BP 5 and the lens-side contact point LP 5 will be referred to as a signal line LDAT and a signal line formed with the body-side contact point BP 6 and the lens-side contact point LP 6 will be referred to as a signal line RDY in the following description.

The body-side contact points BP 7, BP 8, BP 9 and BP 10 are used for data communication referred to as hot line communication. These four body-side contact points are connected to the body-side second communication units 118. The lens-side contact points LP 7, LP 8, LP 9 and LP 10 respectively connected to these four body-side contact points are connected to the lens-side second communication unit 218. The body-side second communication unit 118 and the lens-side second communication unit 218 engage in data communication as they exchange signals via the four body-side contact points BP 7 through BP 10 and the four lens-side contact points LP 7 through LP 10. The data communication (hot line communication) conducted by the body-side second communication unit 118 and the lens-side second communication unit 218 will be described in detail later.

It is to be noted that a signal line formed with the body-side contact point BP 7 and the lens-side contact point LP 7 will be referred to as a signal line HREQ in the following description. In addition, a signal line formed with the body-side contact point BP 8 and the lens-side contact point LP 8 will be referred to as the signal line HANS, a signal line formed with the body-side contact point BP 9 and the lens-side contact point LP 9 will be referred to as a signal line HCLK and a signal line formed with the body-side contact point BP 10 and the lens-side contact point LP 10 will be referred to as a signal line HDAT in the following description.

The body-side contact points BP 11 and BP 12 are connected to a second power supply circuit 121 in the camera body 100. The second power supply circuit 121 provides a drive voltage to be used to drive the lens drive unit 212 to the body-side contact point BP 12. In other words, the drive voltage for the lens drive unit 212 is supplied via the body-side contact point BP 12 and the lens-side contact point LP 12. The body-side contact point BP 11 is a ground terminal corresponding to the above drive voltage. This means that the voltage assumed at the body-side contact point BP 11 and the lens-side contact point LP 11 is a ground voltage corresponding to the drive voltage.

In the following description, a signal line formed with the body-side contact point BP 11 and the lens-side contact point LP 11 will be referred to as a signal line PGND. In addition, a signal line formed with the body-side contact point BP 12 and the lens-side contact point LP 12 will be referred to as a signal line BAT.

It is to be noted that the difference between the maximum value and the minimum value taken by the electric current flowing through the body-side contact point BP 11 and the lens-side contact point LP 11 is greater than the difference between the maximum value and the minimum value taken by the electric current flowing through the body-side contact point BP 2 and the lens-side contact point LP 2, since the power used at the lens drive unit 212, which includes a drive system such as an actuator, is greater than the power used in electronic circuits such as the lens-side control unit 203 and the like in the exchangeable lens 200 and no power is used in the lens drive unit 212 when the focusing lens 210b does not need to be driven.

Command Data Communication

The lens-side first communication unit 217 engages in data communication with the body-side first communication unit 117 via the lens-side contact points LP 3 through LP 6 and the signal lines CLK, BDAT, LDAT and RDY. This data communication is repeatedly executed over, for instance, 16 ms intervals. In addition, control data transmitted from the body-side first communication unit 117 are received and response data are transmitted to the body-side first communication unit 117 concurrently through this data communication. The following is a detailed description of the communication conducted by the lens-side first communication unit 217 and the body-side first communication unit 117.

It is to be noted that in the description of the embodiment, the communication between the lens-side first communication unit 217 and the body-side first communication unit 117 will be referred to as "command data communication".

Figure 4:
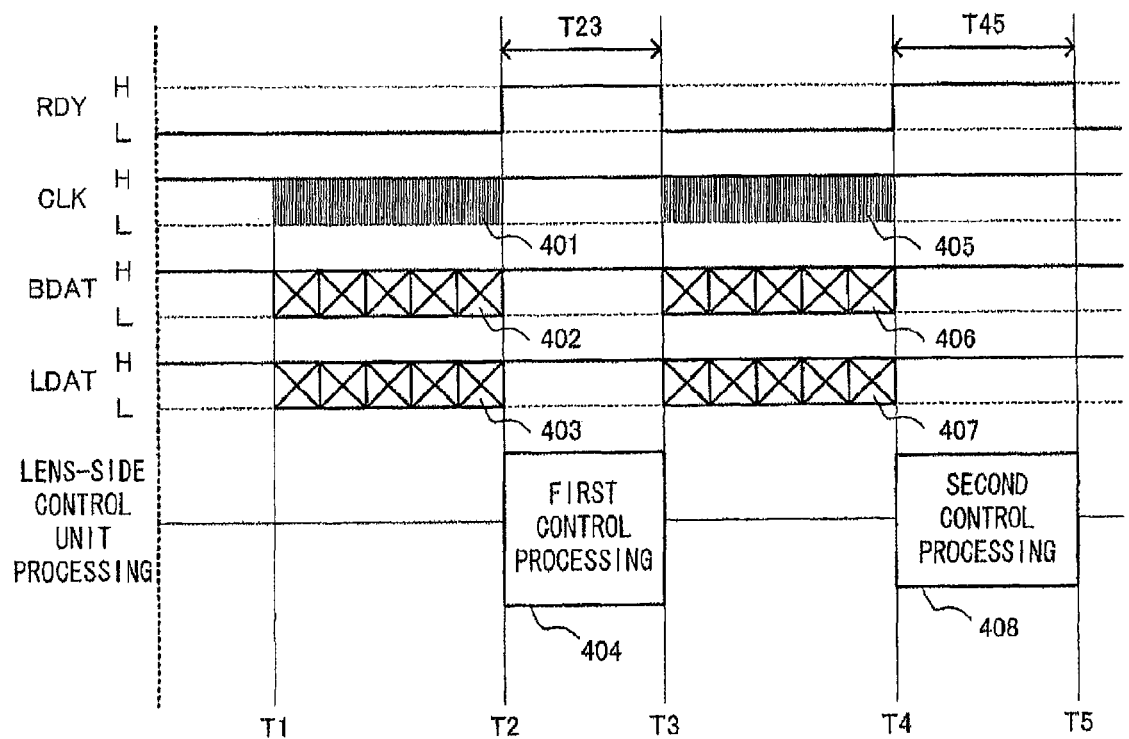
FIG. 4 is a timing chart indicating a specific example of timing with which command data communication may be executed.

FIG. 4 presents a timing chart pertaining to a specific example of command data communication. When the body-side first communication unit 117 and the lens-side first communication unit 217 are not engaged in data communication (prior to a time point T1 in FIG. 4), the signal level corresponding to the truth value L is assumed at the signal line RDY.

The body-side first communication unit 117 first verifies the signal level at the signal line RDY at the start (T1) of the command data communication. The signal level at the signal line RDY indicates whether or not communication via the lens-side first communication unit 217 is enabled. Namely, the lens-side first communication unit 217 transmits to the lens-side contact point LP 6 a ready signal indicating whether or not the lens-side first communication unit 217 is in a data communication enabled state. This ready signal is neither a data signal nor a clock signal. If the lens-side first communication unit 217 is in a data communication disabled state, a signal indicating H (High) level is output from the lens-side contact point LP 6. As long as H level is sustained at the signal line RDY, the body-side first communication unit 117 does not start communication and it starts communication only when the signal level shifts to L level. In addition, while H level is sustained at the signal line RDY, the body-side first communication unit 117 does not execute the next phase of processing for communication currently in progress.

Once the signal level at the signal line RDY shifts to L (Low) level, the body-side first communication unit 117 outputs a clock signal 401 through the body-side contact point BP 3. The body-side first communication unit 117 outputs a body-side command packet signal 402, which constitutes the first half of control data, from the body-side contact point BP 4 in synchronization with the clock signal 401. In addition, in synchronization with the clock signal 401 output to the signal line CLK, the lens-side first communication unit 217 outputs a lens-side command packet signal 403, which constitutes the first half of response data, through the lens-side contact point LP 5.

Once the transmission of the lens-side command packet signal 403 is completed, the lens-side first communication unit 217 sets the signal level at the signal line RDY to H level (T2). The lens-side control unit 203 then starts first control processing 404 corresponding to the contents of the body-side command packet signal 402 having been received. For instance, the contents of the body-side command packet signal 402 having been received may constitute a request for specific data. In such a case, the lens-side control unit 203 executes processing for generating the requested data as the first control processing 404.

Upon completing the first control processing 404, the lens-side control unit 203 notifies the lens-side first communication unit 217 of the completion of the first control processing 404. In response to the notification, the lens-side first communication unit 217 outputs an L-level signal from the lens-side contact point LP 6 (T3). In response to this shift in the signal level, the body-side first communication unit 117 outputs a clock signal 405 from the body-side contact point BP 3. The body-side first communication unit 117 outputs a body-side data packet signal 406, which constitutes the second half of the control data, from the body-side contact point BP 4 synchronously with the clock signal 405. In addition, in synchronization with the clock signal 401 output to the signal line CLK, the lens-side first communication unit 217 outputs a lens-side data packet signal 407, which constitutes the second half of the response data, through the lens-side contact point LP 5.

Once the transmission of the lens-side data packet signal 407 is completed, the lens-side first communication unit 217 sets the signal level at the signal line RDY to H level again (T4). The lens-side control unit 203 then starts second control processing 408 corresponding to the contents of the body-side command packet signal 402 and the body-side data packet signal 406 having been received. For instance, the body-side command packet signal 402 may be a drive instruction for driving the focusing lens 210b and the body-side data packet signal 406 may indicate a drive quantity, i.e., the extent to which the focusing lens 210b should be driven. In such a case, the lens-side control unit 203 executes second control processing 408 for driving the focusing lens 210b by the extent indicated by the drive quantity.

Upon completing the second control processing 408, the lens-side control unit 203 notifies the lens-side first communication unit 217 of the completion of the second control processing 408. In response to the notification, the lens-side first communication unit 217 outputs an L-level signal from the lens-side contact point LP 6 (T5).

The communication conducted between the time point T1 and the time point T5, as described above, constitutes a single command data communication session. As described above, a single body-side command packet signal 402 and a single body-side data packet signal 406 are transmitted via the body-side control unit 103 and the body-side first communication unit 117 through a single command data communication session. Namely, while the control data are transmitted in two split parts to facilitate the processing, the two signals, i.e., the body-side command packet signal 402 and the body-side data packet signal 406, together constitute a set of control data.

Likewise, a single lens-side command packet signal 403 and a single lens-side data packet signal 407 are transmitted via the lens-side control unit 203 and the lens-side first communication unit 217 through a single command data communication session. Namely, the lens-side command packet signal 403 and the lens-side data packet signal 407, together constitute a set of response data.

As described above, the lens-side first communication unit 217 receives the control data from the body-side first communication unit 117 and transmits the response data to the body-side first communication unit 117 concurrently.

Various signals are output by the lens-side first communication unit 217 and the body-side first communication unit 117 to the four signal lines (CLK, BDAT, LDAT and RDY) used for the command data communication. As FIG. 4 clearly indicates, the signal output by the lens-side first communication unit 217 to the signal line RDY undergoes the fewest signal level shifts among these signals. This means that during command data communication with the camera body 100, the lens-side first communication unit 217 controls the lens-side contact points LP 3 through LP 6 so as to ensure that the signal level at the lens-side contact point LP 6 undergoes the fewest level shifts among the four lens-side contact points LP 3 through LP 6.

It is to be noted that a predetermined time restriction (time limit) pertaining to the length of time required for the first control processing 404 and the second control processing 408, is set in advance in the memory in the lens-side control unit 203, so as to avoid retarding the overall camera processing unnecessarily. The control processing (task) executed on the lens-side as part of the command data communication is designed to be completed in approximately several hundred microseconds to several milliseconds under normal circumstances (as long as the normal operating state is sustained on the lens-side). Accordingly, the time restriction mentioned above is set by adding some time margin to the length of time required to complete the lens-side task during the command data communication. The time restriction set in the embodiment is adjusted to an optimal value within a range of, for instance, several tens of milliseconds to several hundreds of milliseconds. In other words, the lens-side control unit 203 executes control so as to ensure that time periods T23 and T45 in FIG. 4 do not exceed the length of time defined by the time restriction. Namely, while the camera body 100 is attached to the lens-side mount unit 201 (i.e., while operation power is supplied from the camera body 100 to the lens control unit 203), the lens-side first communication unit 217 controls the lens-side contact point LP 6 so as to ensure that the signal level corresponding to the truth value H is not sustained at the lens-side contact point LP 6 continuously over a length of time equal to or greater than that defined by the time restriction.

Hot Line Communication

The lens-side second communication unit 218 transmits lens position data to the body-side second communication unit 118 via the lens-side contact points LP 7 through LP 10, i.e., via the signal lines HREQ, HANS, HCLK and HDAT. The communication conducted by the lens-side second communication unit 218 and the body-side second communication unit 118 is described in detail below.

It is to be noted that in the description of the embodiment, the communication between the lens-side second communication unit 218 and the body-side second communication unit 118 will be referred to as "hot line communication".

Figure 5A:
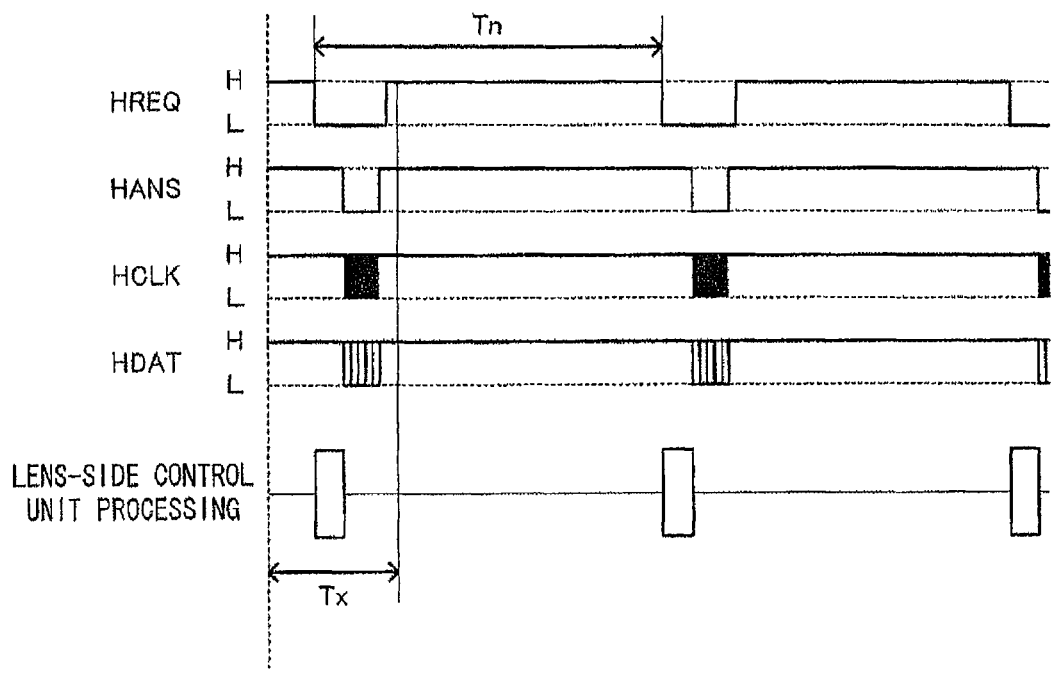
FIGS. 5A and 5B each present timing charts indicating a specific example of timing with which hot line communication may be executed.
Figure 5B:
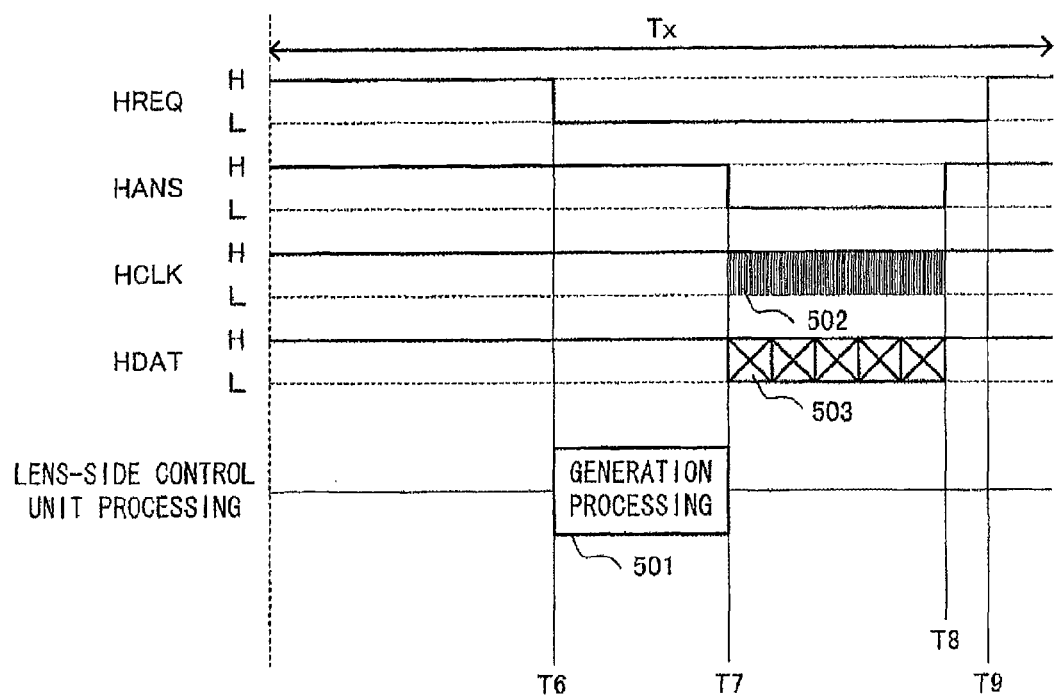

FIGS. 5A and 5B each present a timing chart pertaining to an example of hot line communication. The body-side control unit 103 in the embodiment is configured so as to start the hot line communication over a second predetermined cycle Tn (e.g., over 1 ms intervals in the embodiment). This cycle is shorter than the cycle over which the command data communication is executed. FIG. 5A shows the hot line communication repeatedly executed over the predetermined cycle Tn. FIG. 5B shows a hot line communication session executed over a single communication period Tx, among hot line communication sessions executed repeatedly. The following is a description of the hot line communication procedure, given in reference to the timing chart presented in FIG. 5B.

At a start of hot line communication (T6), the body-side second communication unit 118 outputs an L-level signal from the body-side contact point BP 7. The lens-side second communication unit 218 notifies the lens-side control unit 203 that the L-level signal has been input to the lens-side contact point LP 7. In response to the notification, the lens-side control unit 203 starts executing lens position data generation processing 501. Through the generation processing 501, the lens-side control unit 203 engages the lens position detection unit 213 in detection of the position of the focusing lens 210b and generates lens position data indicating the detection results.

As the lens-side control unit 203 completes the execution of the generation processing 501, the lens-side second communication unit 218 outputs an L-level signal from the lens-side contact point LP 8 (T 7). As the L-level signal is input to the body-side contact point BP 8, the body-side second communication unit 118 outputs a clock signal 502 from the body-side contact point BP 9. In synchronization with the clock signal 502, the lens-side second communication unit 218 outputs a lens position data signal 503 carrying the lens position data from the lens-side contact point LP 10.

Upon completing the transmission of the lens position data signal 503, the lens-side second communication unit 218 outputs an H-level signal from the lens-side contact point LP 8 (T8). In response to the signal input to the body-side contact point BP 8, the body-side second communication unit 118 outputs an H-level signal from the body-side contact point BP 7 (T9).

The communication conducted between the time point T6 and the time point T9 as described above constitutes a single hot line communication session. As explained above, a single lens position data signal 503 is transmitted via the lens-side control unit 203 and the lens-side second communication unit 218 through the single hot line communication session.

Signals which are neither clock signals nor data signals are output at the lens-side contact points LP 7 and LP 8 among the four lens-side contact points LP 7 through LP 10 used in hot line communication. The signal levels at these two lens-side contact points undergo more signal level shifts than the signal level at the lens-side contact point LP 6 used in the command data communication, since hot line communication is executed over a shorter cycle compared to command data communication.

For instance, assuming that command data communication is executed over 16 ms intervals and that hot line communication is executed over 1 ms intervals, the signal level at the lens-side contact point LP 6 shifts four times in every 16 ms period. During hot line communication executed over 1 ms intervals, the signal levels at the lens-side contact points LP 7 and LP 8, which shift twice during a single communication session, each shift 32 times during each 16 ms period.

This means that during command data communication and hot line communication with the camera body 100, the lens-side first communication unit 217 controls the lens-side contact points LP 3 through LP 10 so that the lens-side contact point LP 6 undergoes the fewest signal level shifts among the lens-side contact points LP 3 through LP 6.

It is to be noted that command data communication and hot line communication can be simultaneously executed in parallel. Namely, while either the lens-side first communication unit 217 or the lens-side second communication unit 218 is engaged in communication with the camera body 100, the other lens-side communication unit, too, is able to communicate with the camera body 100.

Exchangeable Lens Engagement/Disengagement Detection

Figure 6A:
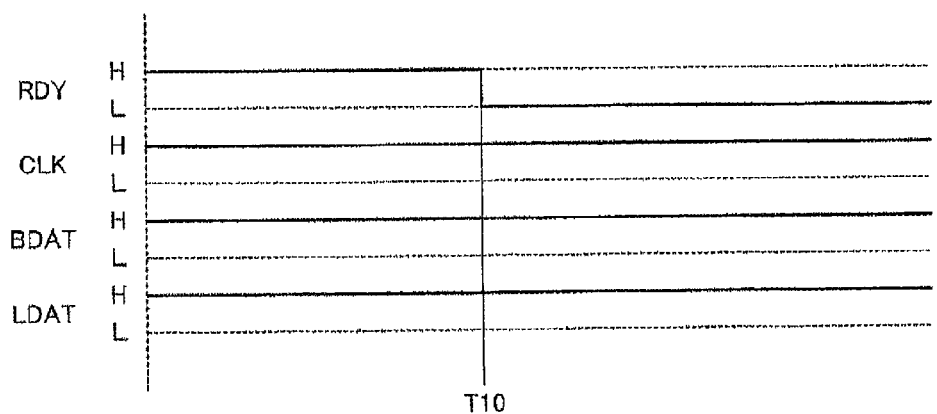
FIGS. 6A and 6B present timing charts indicating how a lens engagement/disengagement detection unit may detect engagement/disengagement of an exchangeable lens.

FIG. 6A presents a timing chart showing how the lens engagement/disengagement detection unit 118 detects engagement of the exchangeable lens 200. If the exchangeable lens 200 is not mounted at the camera body 100, the body-side contact point BP 6 remains in a pulled up state (see FIG. 3) and thus, the signal level corresponding to the truth value H is assumed at the body-side contact point BP 6. Once the exchangeable lens 200 is mounted, the body-side contact point BP 6 assumes the signal level corresponding to the truth value L (T10) since the lens-side contact point LP 6 is in a pulled down state (see FIG. 3). The lens engagement/disengagement detection unit 119 detects engagement of the exchangeable lens 200 as the signal level at the body-side contact point BP 6 shifts to that corresponding to the truth value L as described above. Upon detecting engagement of the exchangeable lens 200 with the camera body 100, the body-side control unit 103 starts supplying power to the exchangeable lens 200 and also starts communication operation to communicate with the exchangeable lens 200.

Figure 6B:
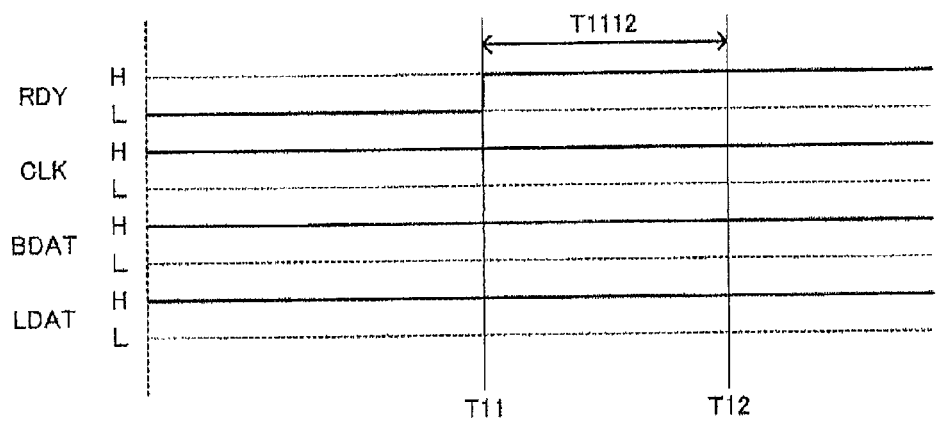

FIG. 6B is a timing chart showing how the lens engagement/disengagement detection unit 119 detects disengagement of the exchangeable lens 200. As the exchangeable lens 200 is disengaged from the camera body 100, the body-side contact point BP 6 resumes the signal level corresponding to the truth value H (T11). At this point in time, the lens engagement/disengagement detection unit 119 cannot determine whether this signal level shift has been caused by a signal output to the signal line RDY by the lens-side first communication unit 217 or by disengagement of the exchangeable lens 200.

Once the signal level at the body-side contact point BP 6 shifts to that corresponding to the truth value H, the lens engagement/disengagement unit 119 monitors the body-side contact point BP 6 to ascertain whether the signal level is sustained over a length of time equal to or greater than the length of time defined by the time restriction (described in reference to FIG. 4).

If the signal level shift having occurred at the time point T11 is attributable to a signal output by the lens-side first communication unit 217, the body-side contact point BP 6 should resume the signal level corresponding to the truth value L before the length of time corresponding to the time restriction elapses following the time point T11. However, if the body-side contact point BP 6 sustains the signal level corresponding to the truth value H even after the length of time defined by the time restriction elapses, the signal level shift can be determined to be attributable to disengagement of the exchangeable lens 200. Accordingly, the lens engagement/disengagement detection unit 118 detects disengagement of the exchangeable lens 200 at a time point T12 occurring after a predetermined length of time T1112 equal to or greater than the length of time defined by the time restriction, elapses following the time point T11.

As described above, the lens engagement/disengagement detection unit 119 detects disengagement of the exchangeable lens 200 if the body-side contact point BP 6 sustains the signal level corresponding to the truth value H continuously over a length of time equal to or greater than the length of time defined by the time restriction. It is to be noted that the lens engagement/disengagement detection unit 119 in the embodiment detects (judges) that the exchangeable lens has been disengaged in reference to a decision-making reference time length over which the body-side contact point BP 6 sustains (continuously holds) the signal level corresponding to the truth value H, "equal to or greater than the length of time defined by the time restriction". The length of time "equal to or greater than the length of time defined by the time restriction" may be the exact length of time defined by the time restriction or it may be a length of time greater than that defined by the time restriction (up to several times that defined by the time restriction).

It is to be noted that the signal at the body-side contact point BP 6 may sustain the signal level corresponding to the truth value H continuously over a length of time equal to or greater than that defined by the time restriction for a reason other than disengagement of the exchangeable lens 200 described above. For instance, the signal level corresponding to the truth value H may be sustained when the exchangeable lens-side is in a hung state while the exchangeable lens remains engaged with the camera body or when contact between the communication contact points is poor. Upon detecting that the body-side contact point BP 6 has sustained the signal level corresponding to the truth value H continuously over a length of time equal to or greater than that defined by the time restriction for any of the reasons (causes) listed above, the body-side control unit 103 at the camera body 100 executes processing for cutting off the power supply to the exchangeable lens 200.

As a result, even if the signal level at the signal line RDY on the exchangeable lens-side is continuously held at H level due to a hang or poor contact at the communication contact points, power supply from the camera side to the exchangeable lens-side is cut off and thus, the operation at the lens-side control unit 203 stops, causing the lens-side contact point LP 6 to assume the signal level corresponding to the truth value L via the pull-down resistor R2. In other words, as the signal level at the signal line RDY on the exchangeable lens-side shifts to L level, the camera body 100 is engaged in behavior similar to that described in reference to FIG. 6A. More specifically, the lens engagement/disengagement detection unit 119 located on the camera body-side determines that the exchangeable lens has been reengaged and the body-side control unit 103 starts power supply to the exchangeable lens 200 and communication with the exchangeable lens 200.

The following operational advantages are achieved in the first embodiment of the camera system described above.

(1) The exchangeable lens 200 includes the lens-side first communication unit 217 that engages in data communication with the camera body 100 by exchanging signals with the camera body 100 via the lens-side contact points LP 3 through LP 6. The lens-side contact point LP 6 is connected to the body-side contact point BP 6 which is utilized at the camera body 100 for purposes of detection of engagement/disengagement of the exchangeable lens 200. The lens-side first communication unit 217 outputs a signal which is neither a data signal nor a clock signal to the lens-side contact point LP 6 and controls the lens-side contact point LP 6 so as to ensure that the body-side contact point BP 6 does not sustain the signal level corresponding to the truth value H continuously over a length of time equal to or greater than a predetermined time length while the camera body 100 is attached to the lens-side mount unit 201. Namely, the lens-side first communication unit 217 controls the lens-side contact point LP 6 so as to output a signal that disallows detection of disengagement of the exchangeable lens 200 from the camera body 100 while the operating voltage is supplied from the camera body 100 via the lens-side contact point LP 1. This means that while the operating voltage is supplied from the camera body 100 via the lens-side contact point LP 1, the lens-side first communication unit 217 controls the output through the lens-side contact point LP 6 so as to ensure that the camera body 100 is not allowed to determine that the exchangeable lens 200 is disengaged from the camera body 100. The lens-side contact point LP 6 is configured so that the body-side contact point BP 6 is allowed to assume the signal level corresponding to the truth value L when the camera body 100 is attached to the lens-side mount unit but no data communication is in progress via the lens-side first communication unit 217. As a result, lens engagement/disengagement can be detected without having to modify the simple communication procedure.

(2) At the camera body 100, the body-side first communication unit 117, which conducts data communication with the exchangeable lens 200 by exchanging signals with the exchangeable lens 200 via the body-side contact points BP 3 through BP 6, and the lens engagement/disengagement detection unit 119, which detects engagement/disengagement of the exchangeable lens 200 based upon the signal level indicated at the body-side contact point BP 6 are disposed. The body-side contact point BP 6 is connected to the lens-side contact point LP 6, among the lens-side contact points LP 3 through LP 6, to which a signal that is neither a data signal nor a clock signal is output from the exchangeable lens 200. In addition, the body-side contact point BP 6 is configured so as to assume the signal level corresponding to the truth value H when the exchangeable lens 200 is not mounted at the body-side mount unit 101 and to assume the signal level corresponding to the truth value L when the exchangeable lens is mounted at the body-side mount unit 101 but no communication is in progress via the body-side first communication unit 117. When the exchangeable lens 200 is mounted at the body-side mount unit 101, the body-side first communication unit 117 receives, via the body-side contact point BP 6, a signal that does not sustain the signal level corresponding to the truth value H continuously over a length of time equal to or greater than a predetermined time length. The lens engagement/disengagement unit 119 detects disengagement of the exchangeable lens 200 when the body-side contact point BP 6 has sustained the signal level corresponding to the truth value H continuously over a length of time equal to or greater than the predetermined time length and detects engagement of the exchangeable lens 200 when the signal level at the body-side contact point BP 6 has shifted to that corresponding to the truth value L. As a result, lens engagement/disengagement can be detected without having to modify the simple communication procedure.

(3) The lens-side first communication unit 217 controls the lens-side contact points LP 3 through LP 6 so as to ensure that the lens-side contact point LP 6 among the lens-side contact points LP 3 through LP 6 undergoes the fewest signal level shifts during data communication between the exchangeable lens 200 and the camera body 100. As a result, the circuit design pertaining to the lens-side first communication unit 217 and the lens-side contact points LP 3 through LP 6 is facilitated.

(4) The exchangeable lens 200 includes the lens-side contact points LP 7 through LP 10, to be respectively connected to the body-side contact point BP 7 through BP 10 disposed at the camera body 100 for purposes of hot line communication, and the lens-side second communication unit 218, which engages in data communication with the camera body 100 via the lens-side contact points LP 7 through LP 10. The lens-side first communication unit 217 controls the lens-side contact points LP 3 through LP 6 so as to ensure that the lens-side contact point LP 6 among the lens-side contact points LP 3 through LP 10 undergoes the fewest signal level shifts during data communication with the camera body 100. As a result, the circuit design pertaining to the lens-side first communication unit 217 and the lens-side second communication unit 218 is facilitated.

(5) The lens-side contact point LP 6 is grounded via the pull-down resistor R2 within the exchangeable lens 200. Thus, as the exchangeable lens 200 is engaged with the camera body 100, the signal level at the body-side contact point BP 6 shifts to that corresponding to the truth value L, enabling engagement detection by the lens engagement/disengagement detection unit 119.

Second Embodiment

Figure 7:
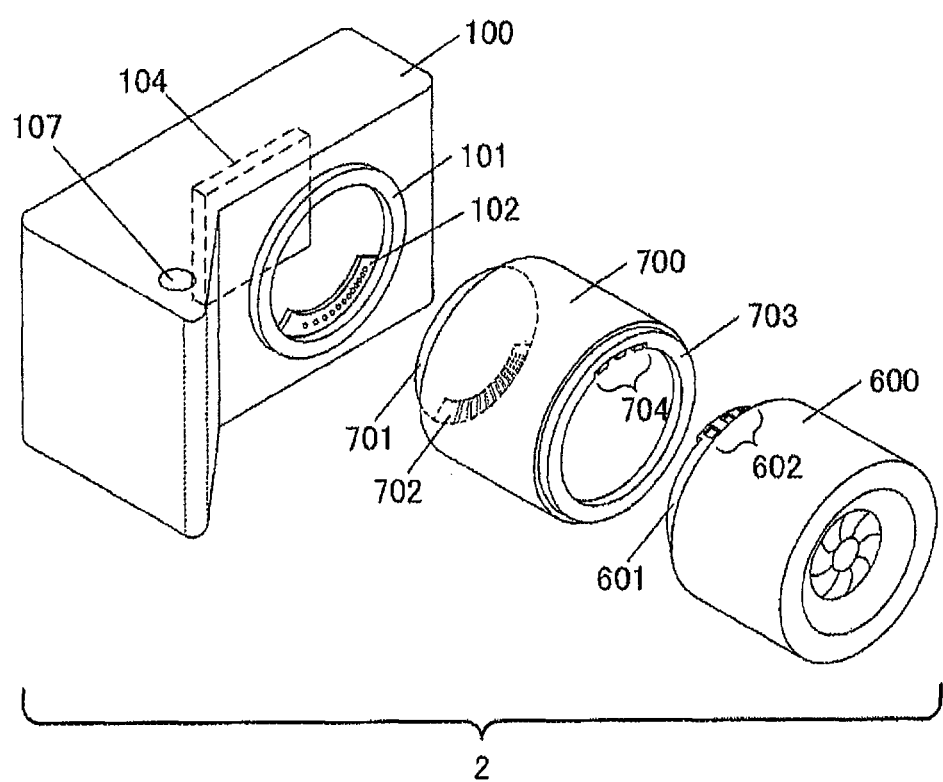
FIG. 7 is a perspective of a camera system used in injunction with exchangeable lenses, which includes a middle adapter, achieved in another embodiment of the present invention.

FIG. 7 is a perspective of the camera system achieved in the second embodiment. A camera system 2 achieved in this embodiment comprises a camera body 100, a middle adapter 700 that can be detachably mounted at the camera body 100 and an exchangeable lens 600 that can be detachably mounted at the middle adapter 700. It is to be noted that in the following description, members and the like identical to those in the first embodiment will be assigned with the same reference numerals as in the first embodiment, so as to preclude the necessity for a repeated explanation thereof.

The exchangeable lens 600 is compatible with a camera body having mount specifications thereof different from those of the camera body 100. In other words, a lens-side mount unit 601 of the exchangeable lens 600 conforms to mount specifications different from those of a body-side mount unit 101 at the camera body 100, and thus the exchangeable lens 600 cannot be mounted at the camera body 100. In addition, while the exchangeable lens 600 is similar to the exchangeable lens 200 shown in FIG. 1 in that it includes a holding portion 602 with a plurality of contact points disposed thereat, located near the lens-side mount unit 601, the shape of the holding portion 601 is different from that of the holding portion 102 of the camera body 100.

The middle adapter 700 is a mount adapter used to allow such an exchangeable lens 600 to be mounted at the camera body 100. More specifically, the casing of the middle adapter 700 is formed in a cylindrical shape. The middle adapter 700 includes a first mount portion 701, located at one side surface thereof, which corresponds to the body-side mount unit 101 (conforming to mount specifications corresponding to those of the body-side mount unit 101). The middle adapter 700 further includes a second mount portion 703, located at the opposite side surface, which corresponds to the lens-side mount unit 601 (conforming to mount specifications corresponding to those of the lens-side mount unit 601). It is to be noted that the casing does not need to be cylindrical and the embodiment may be adopted in conjunction with a casing assuming another shape. The first mount portion 701 can be detachably mounted at the body-side mount unit 101 of the camera body 100. In addition, the second mount portion 703 can be detachably mounted at the lens-side mount unit 601 of the exchangeable lens 600.

The middle adapter 700 includes a holding portion 702 similar to the holding portion of the exchangeable lens 200 in the first embodiment, which is provided at a position near the first mount portion 701 (on the inner circumferential side of the first mount portion 701) and projects out along part of the inner circumference of the first mount portion 701 so as to hold contact points. A plurality of contact points are disposed at the holding portion 702. As the middle adapter 700 is engaged with the camera body 100, the holding portion 702, holding the plurality of contact points, becomes electrically and physically connected with the holding portion 102 with a plurality of contact points disposed thereat. Since the first mount portion 701 and the holding portion 702 adopt structures similar to those of the lens-side mount unit 201 and the holding portion 202 having been described in reference to the first embodiment, a further explanation is not provided.

In addition, the middle adapter 700 includes a holding portion 704, which is provided at a position near the second mount portion 703 (on the inner circumferential side of the second mount portion 703) and projects out along part of the inner circumference of the second mount portion 703 so as to hold contact points. A plurality of contact points are disposed at the holding portion 704. The exchangeable lens 600 includes a holding portion 602, at which contact points are held, located near the lens-side mount unit 601. A plurality of contact points are disposed at the holding portion 602. As the exchangeable lens 600 is engaged with the middle adapter 700, the holding portion 602, holding a plurality of contact points, becomes electrically and physically connected with the holding portion 704 with a plurality of contact points disposed thereat.

As engagement/disengagement of the exchangeable lens 200 is detected at the camera body in the first embodiment, engagement/disengagement of the middle adapter 700 is detected at the camera body 100. In other words, the individual contact points disposed at the holding portion 702 of the middle adapter 700 are configured similar to the various contact points at the holding portion 202 of the interchangeable lens 200 in the first embodiment. For instance, lens-side contact points LP 1 through LP 12, such as those described in reference to the first embodiment, are disposed at the holding portion 702. As the middle adapter 700 is mounted, the signal level at the body-side contact point BP 6 shifts to that corresponding to the truth value L, since the lens-side contact points LP 6 at the holding portion 702 is in a pulled down state. The lens engagement/disengagement detection unit 119 detects engagement of the middle adapter 700 as the signal level at the body-side contact point BP 6 shifts to that corresponding to the truth value L, as described above. Upon detecting engagement of the middle adapter 700 with the camera body 100, the body-side control unit 103 starts supplying power to the middle adapter 700 and also starts communication operation to communicate with the middle adapter 700. The middle adapter 700 functions as an intermediary to enable communication between the exchangeable lens 600 and the camera body 100 via its various communication contact points located at the holding portion 704.

The middle adapter 700 further includes an adapter control unit (not shown). This adapter control unit engages in communication with the body-side control unit 103, as does the lens-side control unit 203 in the exchangeable lens 200 described earlier. In addition, the adapter control unit executes drive control in order to drive a drive target member (e.g., an aperture drive lever via which aperture blades, located within the exchangeable lens 600, are driven) disposed within the middle adapter 700. Moreover, as long as the middle adapter 700 is engaged with the camera body 100, the adapter control unit executes control similar to that executed for the signal level at the lens-side contact point LP 6 of the exchangeable lens 200 as described earlier. Namely, as long as the camera body 100 is attached to the first mount portion 701, the adapter control unit controls the contact point at the middle adapter corresponding to the lens-side contact point LP 6 so as to ensure that the middle adapter contact point corresponding to the lens-side contact point LP 6 does not sustain the signal level corresponding to the truth value H continuously over a length of time equal to or greater than that defined by the time restriction.

As the middle adapter 700 is disengaged from the camera body 100, the signal level at the body-side contact point BP 6 shifts back to that corresponding to the truth value H. If the body-side contact point BP 6 sustains the signal level corresponding to the truth value H longer than the time length defined by the time restriction described earlier, the lens engagement/disengagement detection unit 119 detects disengagement of the middle adapter 700.

In the camera system achieved as described above in the second embodiment, operational advantages similar to those of the first embodiment can be achieved through the use of the middle adapter.

The following variations are also within the technical scope of the present invention and a single variation or a plurality of variations may be adopted in combination with either of the embodiments described above.

Variation 1

The lens-side second communication unit 218 may transmit data other than the lens position data to the body-side second communication unit 118 through hot line communication. For instance, data pertaining to the aperture diameter or data pertaining to the blur correction lens position may be transmitted.

Variation 2

An exchangeable lens with a manual focusing lens, in conjunction with which position information indicating the position of the focusing lens 210b is not required, does not need to include the lens-side contact points LP 7 through LP 10 and the lens-side second communication unit 218. The lens engagement/disengagement detection unit 119, which detects engagement/disengagement of the exchangeable lens 200 via the body-side contact point BP 6, is able to accurately detect engagement/disengagement of the exchangeable lens 200 without the lens-side contact points LP 7 through LP 10 used for hot line communication.

Variation 3

The present invention may be adopted in camera systems compatible with exchangeable lenses that adopt structures different from those described in reference to the embodiments. For instance, the present invention may be adopted in a single-lens reflex camera with a mirror disposed within the camera body to achieve advantages similar to those of the embodiments described earlier.

Variation 4

Figure 8:
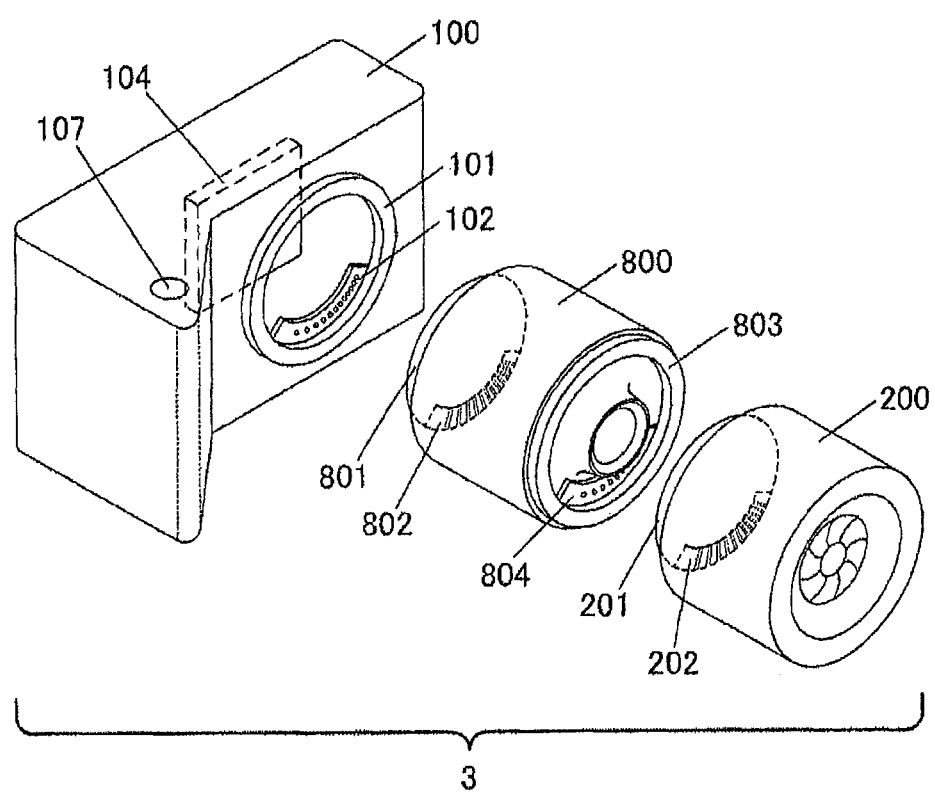
FIG. 8 is a perspective of a camera system used in injunction with exchangeable lenses, which includes a middle adapter, achieved in yet another embodiment of the present invention.

The middle adapter in the second embodiment may be a wide-angle converter or a telephoto converter that includes a specific type of optical system. A camera system 3 in FIG. 8 represents an example of a configuration that includes such a middle adapter. A middle adapter 800 in the camera system 3, mounted between the camera body 100 and the exchangeable lens 200 in the first embodiment, includes a third mount portion 801 corresponding to the camera body and a fourth mount portion 803 corresponding to the exchangeable lens 200 and lengthens the focal length of the optical system in the exchangeable lens 200 by an extent corresponding to a predetermined magnification factor. The present invention may be adopted in conjunction with this middle adapter 800.

It is to be noted that the middle adapter in FIG. 8 includes a holding portion 802, which is connected with the holding portion 102 at the camera body 100, located near the third mount portion 801. In addition, it includes a holding portion 804, which is connected with the holding portion 202 at the exchangeable lens 200, located near the fourth mount portion 803. The holding portions 802 and 804 in this configuration may be structured so that signals each input (output) via one of the contact points at the holding portion 802 are output (input) through the corresponding contact points at the holding portion 804 without conversion. As an alternative, the microprocessor (control unit) within the middle adapter 800 may execute control so that, following communication conducted via one of the holding portions, the communication results are sent through communication conducted via the other holding portion. In this case, the contact points at the holding portion 802 should be structured similar to those at the holding portion 202 in the first embodiment. For instance, the terminal used for detection of engagement/disengagement of the middle adapter 800 should be grounded via a pull-down resistor within the middle adapter 800 and the microprocessor within the middle adapter 800 should control this terminal as has been described in reference to the first embodiment. Furthermore, the microprocessor within the middle adapter 800 should control the contact point at the middle adapter 800 corresponding to the lens-side contact point LP 6 so as to ensure that as long as the camera body 100 is engaged with the third mount portion 801, the contact point at the middle adapter 800 corresponding to the lens-side contact point LP 6 does not sustain the signal level corresponding to the truth value H continuously over a length of time equal to or greater than that defined by the time restriction explained earlier.

Variation 5

While the present invention is adopted in an exchangeable lens, a middle adapter or the like that can be detachably mounted at the camera body in the embodiments described above, the present invention may be adopted in conjunction with an accessory other than an exchangeable lens or a middle adapter, as long as it can be detachably mounted at the camera body.

By adopting any of the embodiments of the present invention or variations thereof described above, lens engagement/disengagement can be detected through a simple structure.

The above described embodiments are examples, and various modifications can be made without departing from the scope of the invention.

What is claimed is:

1. A camera accessory to be detachably mounted at a camera body that includes a first body contact point and a second body contact point and detects disengagement of the camera accessory when the second body contact point sustains a signal level corresponding to a first truth value continuously over a length of time equal to or greater than a predetermined time length, the camera accessory comprising:
   a mounting device to be detachably mounted at the camera body;
   a first accessory contact point that is connected with the first body contact point while the camera accessory is engaged with the camera body by the mounting device and to which an information communication operation with the camera body is executed;
   a second accessory contact point that is connected with the second body contact point while the camera accessory is engaged with the camera body by the mounting device so as to allow a signal that has a level corresponding to the first truth value to be output to the camera body during a time period in which the information communication operation via the first accessory contact point is disallowed; and
   an accessory-side communication control device that executes the information communication operation with the camera body via the first accessory contact point, wherein:
   the accessory-side communication control device executes control so as to ensure that a time length during which the signal that has a level corresponding to the first truth value continues to be output at the second accessory contact point is less than the predetermined time length while the mounting device is mounted at the camera body.

2. The camera accessory according to claim 1, wherein:
   the camera accessory is an exchangeable lens detachably mounted at the camera body.

3. The camera accessory according to claim 1, wherein:
   the camera accessory is a middle accessory that includes two mount portions; and
   the camera body is detachably mounted at one mount portion among the two mount portions and an exchangeable lens, which cannot be mounted detachably at the camera body, is detachably mounted at another mount portion among the two mount portions.

4. The camera accessory according to claim 1, wherein a pull-down resistor is electrically connected to the second accessory contact point.

5. The camera accessory according to claim 1, wherein the accessory-side communication control device executes control so as to ensure that a signal having a level corresponding to a second truth value is output at the second accessory contact point when the mounting device is mounted at the camera body and the information communication operation via the first accessory contact point is not in progress, the second truth value being output during a time period in which the information communication operation is allowed.

6. The camera accessory according to claim 1, wherein:
the first accessory contact point is connected with the first body contact point by way of a first signal line, and the accessory-side communication control device executes the information communication operation with the camera by shifting, on the first signal line, between a first level and a second level that is different from the first level;
the accessory-side communication control device executes control so as to ensure that the output at the second accessory contact point shifts between the signal having the level corresponding to the first truth value and a signal having a level corresponding to a second truth value, the second truth value being output during a time period in which the information communication operation via the first accessory contact point is allowed; and
during information communication, the accessory-side communication control device executes control so as to ensure that the output at the second accessory contact point shifts between the signal having the level corresponding to the first truth value and the signal having the level corresponding to the second truth value less than the first signal line shifts between its first and second levels.

7. A camera accessory to be detachably mounted at a camera body that includes a first body contact point and a second body contact point and detects disengagement of the camera accessory when the second body contact point sustains a signal level corresponding to a first truth value continuously over a length of time equal to or greater than a predetermined time length, the camera accessory comprising:
a mounting device to be detachably mounted at the camera body;
an accessory-side communication control device that executes an information communication operation with the camera body while the camera accessory is engaged with the camera body by the mounting device;
a first accessory contact point that is connected with the first body contact point while the camera accessory is engaged with the camera body by the mounting device so as to receive an operating voltage supplied from the camera body;
a second accessory contact point that is connected with the second body contact point while the camera accessory is engaged with the camera body by the mounting device so as to allow a signal that has a level corresponding to the first truth value to be output to the camera body during a time period in which the information communication operation is disallowed, wherein:
the accessory-side communication control device executes control so as to ensure that a time length during which the signal that has a level corresponding to the first truth value continues to be output at the second accessory contact point is less than the predetermined time length while the operating voltage is supplied from the camera body via the first accessory contact point.

8. The camera accessory according to claim 7, wherein:
the camera accessory is an exchangeable lens detachably mounted at the camera body.

9. The camera accessory according to claim 7, wherein:
the camera accessory is a middle accessory that includes two mount portions; and
the camera body is detachably mounted at one mount portion among the two mount portions and an exchangeable lens, which cannot be mounted detachably at the camera body, is detachably mounted at another mount portion among the two mount portions.

10. The camera accessory according to claim 7, wherein a pull-down resistor is electrically connected to the second accessory contact point.

11. The camera accessory according to claim 7, wherein the accessory-side communication control device executes control so as to ensure that a signal having a level corresponding to a second truth value is output at the second accessory contact point when the mounting device is mounted at the camera body and the information communication operation is not in progress, the second truth value being output during a time period in which the information communication operation is allowed.

12. The camera accessory according to claim 7, wherein:
the accessory-side communication control device executes the information communication operation with the camera body by way of a signal line, the information communication operation being executed by shifting, on the signal line, between a first level and a second level that is different from the first level;
the accessory-side communication control device executes control so as to ensure that the output at the second accessory contact point shifts between the signal having the level corresponding to the first truth value and a signal having a level corresponding to a second truth value, the second truth value being output during a time period in which the information communication operation is allowed; and
during information communication, the accessory-side communication control device executes control so as to ensure that the output at the second accessory contact point shifts between the signal having the level corresponding to the first truth value and the signal having the level corresponding to the second truth value less than the signal line shifts between its first and second levels.

13. A camera accessory configured to be detachably mounted to a camera body, the camera accessory comprising:
an accessory contact point configured, when the camera accessory is mounted to the camera body, to output to the camera body a ready signal that indicates whether or not an information communication operation with the camera body is enabled,
wherein the accessory contact point is configured to output, when the camera accessory is mounted to the camera body and the information communication operation is not in progress, a first level of the ready signal indicating that the information communication operation is enabled.

14. The camera accessory according to claim 13, wherein the accessory contact point is configured to output the first level of the ready signal before the information communication operation commences.

15. The camera accessory according to claim 14, wherein:
the first level is a low level of the ready signal, and
a second level of the ready signal, which indicates that the information communication operation is disabled, is a high level.

16. A camera accessory configured to be detachably mounted to a camera body, the camera accessory comprising:
   a ready contact point configured, when the camera accessory is connected the camera body, to output to the camera body a ready signal that is at either (i) a first level indicating that information communication is enabled or (ii) a second level indicating that the information communication is disabled;
   a clock contact point configured, when the camera accessory is connected the camera body and when the ready signal is at its first level, to input from the camera body a clock signal for the information communication by way of a clock signal line, the clock signal being input when the clock signal line is at a first level and not being input when the clock signal line is at a second level;
   a first data contact configured, when the camera accessory is mounted to the camera body and the ready signal is at its first level, to either output to the camera body or input from the camera body a first data signal for the information communication by way of a first data signal line, the first data signal being output or input when the first data signal line is at a first level and not being output or input when the first data signal line is at a second level,
   wherein, during an information communication operation, the ready signal shifts between its first level and its second level less than the clock signal line and the first data signal line shift between their respective first levels and second levels.

17. The camera accessory according to the claim 16, wherein:
   the first data contact is configured to output to the camera body the first data signal for the information communication by way of the first data signal line;
   the camera accessory further comprises a second data contact that is configured, when the camera accessory is mounted to the camera body and the ready signal is at its first level, to input from the camera body a second data signal for the information communication by way of a second data signal line, the second data signal being input when the second data signal line is at a first level and not being input when the second data signal line is at a second level; and
   during the information communication operation, the ready signal shifts between its first level and its second level less than the clock signal line, the first data signal line, and the second data signal line shift between their respective first levels and second levels.

* * * * *